G. E. LYNCH.
CHILLI ROASTER.
APPLICATION FILED MAY 1, 1916.
1,217,099.
Patented Feb. 20, 1917.
2 SHEETS—SHEET 1.
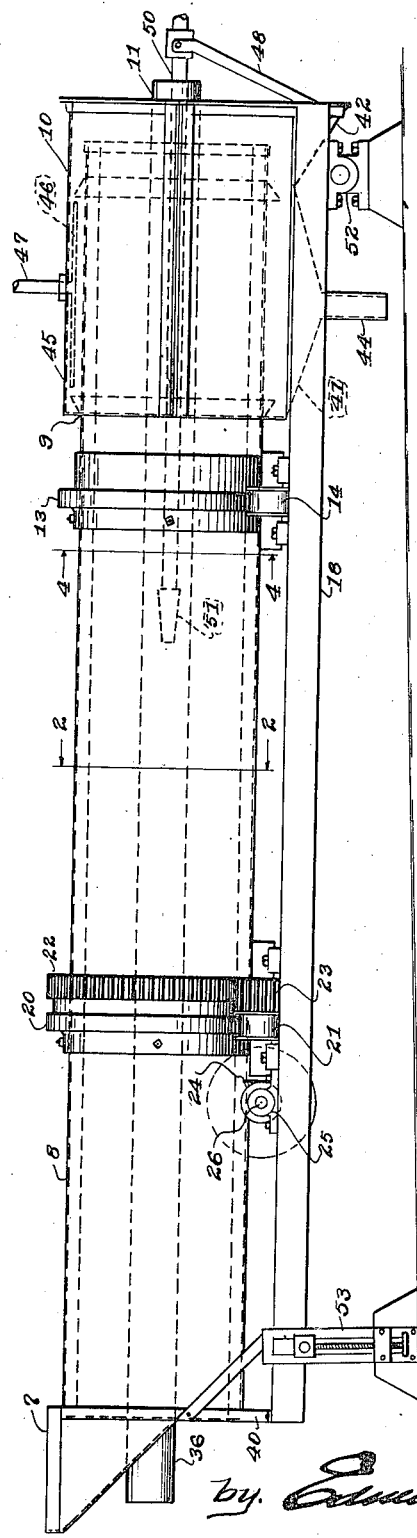
Fig. 1.
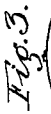
Fig. 3.
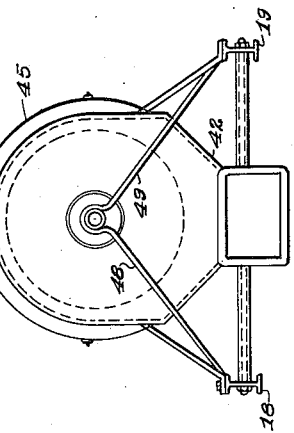
Fig. 2.
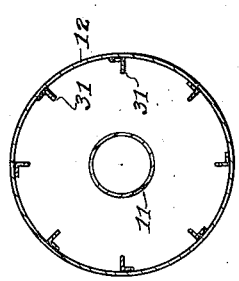
Inventor.
George E. Lynch
by Emmett Strauss
Atty.

G. E. LYNCH.
CHILLI ROASTER.
APPLICATION FILED MAY 1, 1916.
1,217,099.
Patented Feb. 20, 1917.
2 SHEETS—SHEET 2.
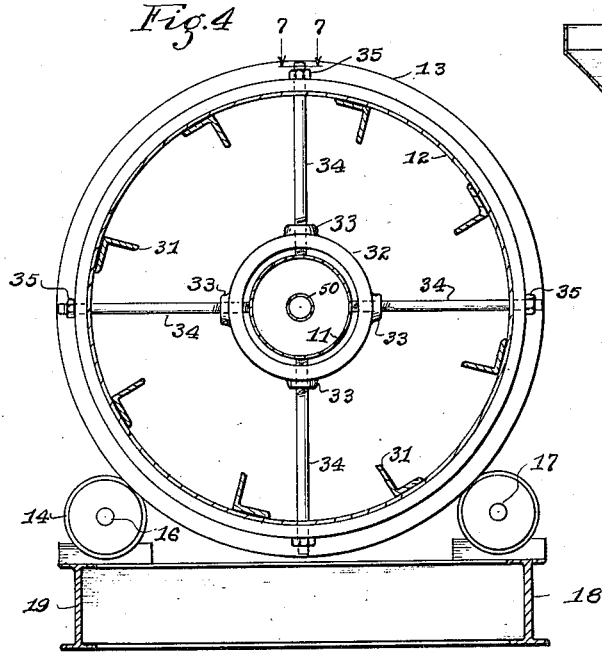
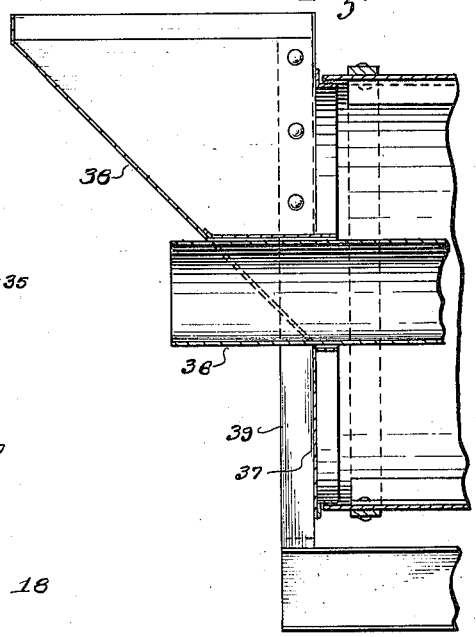
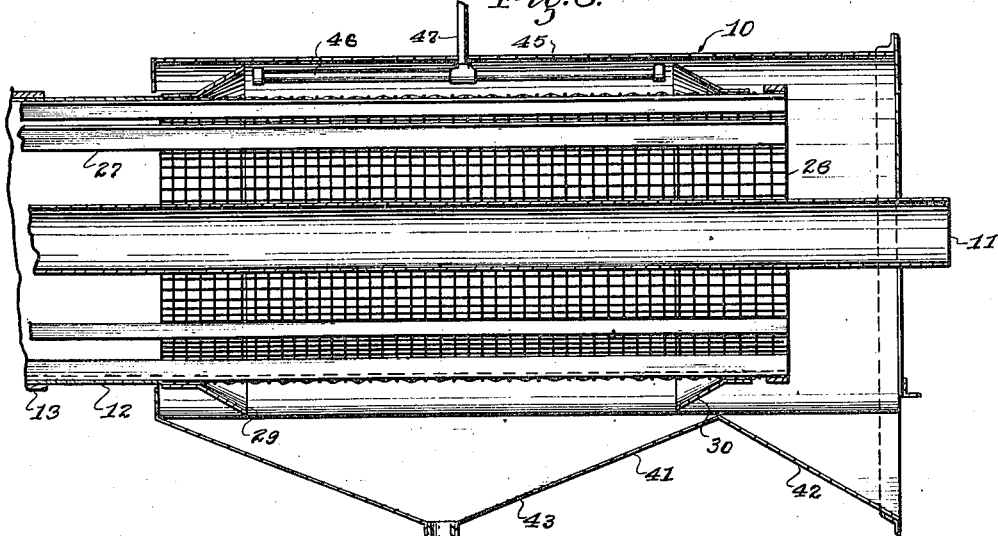
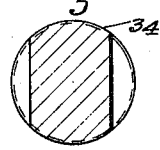
Inventor
George E. Lynch.

UNITED STATES PATENT OFFICE.

GEORGE E. LYNCH, OF LOS ANGELES, CALIFORNIA, ASSIGNOR TO ROYAL PACKING COMPANY, OF LOS ANGELES, CALIFORNIA, A CORPORATION OF CALIFORNIA.

CHILLI-ROASTER.

1,217,099.  Specification of Letters Patent.  Patented Feb. 20, 1917.

Application filed May 1, 1916. Serial No. 94,832.

*To all whom it may concern:*

Be it known that I, GEORGE E. LYNCH, a citizen of the United States, residing at Los Angeles, in the county of Los Angeles and State of California, have invented new and useful Improvements in Chilli-Roasters, of which the following is a specification.

This invention relates to a chilli roaster, and pertains especially to an apparatus for roasting chillis and then treating them to make the skins easily removable.

It is an object of this invention to provide an apparatus in which chilli or like products may be roasted or cooked, and then sprayed with a fluid to loosen the skins whereby the chilli may be easily peeled.

It is another object of this invention to provide an apparatus in which chillis may be fed continuously into one end of the apparatus and be discharged from the other end after having been roasted and treated with the fluid, placing them in condition for immediate peeling.

In the preparation of chillis for canning it is the practice to roast the chillis and then dip them immediately in cold water from which they are removed and peeled, and then placed in the cans wherein they are sealed. It is necessary that this preparation for canning be performed quickly, otherwise the chillis are affected by ferments and bacteria so that they become spoiled after being sealed in the cans.

My improved apparatus provides for quick and thorough preparation of the chillis for peeling without the necessity of being manually treated until they are ready for peeling.

In the accompanying drawings, I have illustrated an embodiment of my invention, in which:

Figure 1 is a side view of a complete roaster.

Fig. 2 is a section as seen on the line 2—2 of Fig. 1.

Fig. 3 is an end view.

Fig. 4 is a section as seen on the line 4—4 of Fig. 1.

Fig. 5 is a longitudinal section of the intake end of the roaster showing the hopper.

Fig. 6 is a longitudinal section of the discharge end.

Fig. 7 is a section as seen on the line 7—7 of Fig. 4.

Referring more particularly to the drawings, the roaster comprises an intake hopper 7 for feeding chillis to the roasting cylinder 8 which is tubular in form and cylindrical, and has a screened extension 9. The screened extension 9 is provided with a hood, waste water discharge and discharge hopper, indicated generally by 10. A heating tube 11 extends through the roaster. The roaster is supported in a position inclined to the horizontal, and the shell is adapted to be rotated.

The roasting cylinder 8 consists of a cylindrical imperforate shell 12 preferably of thin sheet steel having mounted thereon a tire ring 13, preferably of cast iron. The tire 13 is supported upon wheels 14 and 15 which are mounted upon shafts 16 and 17 supported in bearings mounted upon angle irons which form portions of the supporting frame 18. The tire ring 13 supports the lower end of the roasting cylinder for rotation. Adjacent the upper end is a similar tire ring 20 supported upon wheels, one of which is indicated at 21, and arranged similar to the wheels for tire 13. Secured to tire 20 is a gear 22 which meshes with a pinion 23, the latter forming a driving pinion for the gear 22. Pinion 23 is mounted upon the same shaft as wheel 21.

Secured to the shaft is a bevel gear 24 meshing with a bevel gear 25 which is mounted on a shaft 26 extending transverse of the supporting frame, and provided with the usual driving pulleys suitable for belts or other gearing. Disposed at the end of shell 12 and extending therefrom is a frame 27 which consists of axially extending spaced bars upon which is mounted a screen 28. Secured to the frame 27 and over the screen 28 are apron rings 29 and 30.

The interior of shell 12 is provided with inwardly extending fingers 31 which are in the form of angle irons extending longitudinally of the shell with one leg disposed in radial position. The fingers 31 are for the purpose of moving the chillis and turning them over in the roasting cylinder as the latter rotates.

Supported axially within the roaster is the heating tube 11 which comprises a pipe supported at the center by means of a pipe supporting ring 32 having radially disposed lugs 33 which are bored and threaded. Radius rods 34 are threaded at their ends and engaged in the threaded bores of the pipe supporting ring. The other ends of the radius rods extend through apertures in the shell and in the tire rings, are threaded and have mounted thereon nuts 35. The ends of the rods are flattened to provide a wrench hold. This construction provides for adjustment and centering of the heating tube, as the rods may be turned by means of a wrench. The heating tube is extended as indicated at 36, making suitable provision for connection to a chimney.

The feed hopper 7 consists of an end ring 37 to which is riveted or otherwise secured the body of the hopper 38. The hopper body 38 is provided with end walls and an inclined bottom extending from about the center of the hopper upwardly. A wall extends from the bottom of the inclined wall downwardly covering the end of the roasting cylinder and thereby closing it. An opening is provided in the hopper through which extends the heating tube. Suitable hopper supports are provided which consist of legs extending from the frame, as indicated at 39 and 40. Below the screened extension is disposed a discharge hopper casing 41 which has an inclined apron portion 42 onto which the chillis drop. The discharge hopper is provided with a trough portion 43 into which is connected a water discharge pipe 44. The discharge hopper 41 encompasses one-half of the screened extension. Secured thereto and encompassing the upper half is a hood 45 within which is disposed a spray pipe 46 having piping connections 47 for the supply of cold water. Cold water as it enters the spray pipe 46 is discharged through the screen and into the waste trough 43, the apron rings 29 and 30 restraining the water to the limits of the waste trough. In the discharge end is a burner support comprising feet 48 and 49 which hold a burner 50, the latter extending into the heating tube 11 with its nozzle 51 disposed within the roasting cylinder. This burner may be made so that it may be removed from the heating tube for the purpose of lighting.

The frame 18 is pivotally mounted at one end, as indicated at 52 and is adjustably supported at the other end by means of a jack, conventionally represented by 53, so that the inclination of the roaster to the horizontal may be varied. The run of chillis vary in the length of time required for roasting and the speed with which they will travel through the roasting cylinder with a given inclination thereof. The jack provides means for varying the inclination of the roasting cylinder to suit the speed of the roaster and character of the chillis.

Chillis are fed into the hopper 7 and pass through the roasting cylinder, being roasted in their passage through heat from the heating tube 11. Fingers 31 agitate the chillis, prevent them from burning, and also assist in the movement of the chillis through the roaster. As the chillis reach the screened extension they are sprayed with cold water which in the heated condition of the chillis causes a loosening of the skins. As the chillis leave the discharge hopper they are peeled by attendants and immediately canned.

Roasters for chillis have heretofore been constructed which included merely a roasting shell which is inclined to the horizontal and is rotated. With such structures the chillis must be handled after being discharged from the roaster, as they must be removed and immersed in cold water. The interval between the discharge of the chillis from the roaster and the immersion in cold water is of such duration that the peels cool slightly and the cold water is not as effective in loosening the peels or skins as in my machine where the chillis are immediately sprayed on passing from the roasting cylinder.

My improved roaster not only saves one manual operation, that is, removing the chillis from the discharge of the roaster to the immersing tank, but also makes the roasting operation more effective as to loosening of the peels. The interval of time during which the chillis are exposed to the air is shortened with the result that there is a lesser number of cans of the roasted chillis lost because of bacteria and ferments effecting them.

What I claim is:

1. A roaster, comprising a rotatable roasting shell, a perforate extension fixed to said shell, a heater disposed longitudinally in said roasting shell, and a spray disposed adjacent said perforate extension for spraying the roasted material.

2. A roaster, comprising a rotatable tubular roasting shell, a perforate tubular extension fixed to said shell, a heater tube extending through said roasting shell, a spray disposed adjacent said perforate extension for spraying the material roasted, and means for rotating said shell.

3. A roaster, comprising a rotatable tubular roasting shell inclined to the horizontal and having inwardly extending fingers on the interior of said shell, a perforate extension fixed to said shell, a heater disposed in said roasting shell, and a spray disposed at said perforate extension for spraying the roasted material.

4. A roaster, comprising a rotatable tubular roasting shell inclined to the horizontal and having inwardly extending fingers on the interior of said shell, a perforate tubular extension fixed to said shell, a heater tube extending through said roasting shell, a spray disposed above said perforate extension for spraying the roasted material, and means for rotating said shell.

5. A roaster, comprising a rotatable tubular roasting shell inclined to the horizontal and having inwardly extending fingers on the interior of said shell, a tubular screened extension fixed to said shell, a heating pipe supported axially of said shell, a spray disposed adjacent said extension, a stationary hood mounted over said spray and embracing said extension, and a discharge hopper secured to said hood.

6. A roaster, comprising a rotatable tubular roasting shell inclined to the horizontal and having inwardly extending fingers on the interior of said shell, a tubular screened extension fixed to said shell, a heating pipe supported axially of said shell, a spray disposed adjacent said extension, a stationary hood mounted over said spray and embracing said extension, and a discharge hopper secured to said hood and provided with a liquid discharge trough below said extension.

In witness that I claim the foregoing I have hereunto subscribed my name this 30th day of March, 1916.

GEO. E. LYNCH.